United States Patent [19]
Price et al.

[11] Patent Number: 5,371,893
[45] Date of Patent: Dec. 6, 1994

[54] LOOK-AHEAD PRIORITY ARBITRATION SYSTEM AND METHOD

[75] Inventors: Donald W. Price, Lake Katrine, N.Y.; Forrest A. Reiley, Eastham, Mass.; William K. Rodiger, Sudbury, Mass.

[73] Assignee: International Business Machines Corporation, Armonk, N.Y.

[21] Appl. No.: 816,358

[22] Filed: Dec. 27, 1991

[51] Int. Cl.[5] .............................................. G06F 13/14
[52] U.S. Cl. .................................. 395/725; 364/242.6; 364/DIG. 1; 364/937.01; 364/DIG. 2
[58] Field of Search ................... 395/725, 325, 425; 364/242.6, DIG. 1, 937.01, DIG. 2

[56] References Cited

U.S. PATENT DOCUMENTS

| | | | |
|---|---|---|---|
| 4,086,629 | 4/1978 | Desyllas et al. | 395/425 |
| 4,159,532 | 6/1979 | Getson, Jr. et al. | 395/275 |
| 4,313,161 | 1/1982 | Hardin et al. | 395/425 |
| 4,363,094 | 12/1982 | Kaul et al. | 395/325 |
| 4,481,572 | 11/1984 | Ochsner | 395/325 |
| 4,535,420 | 8/1985 | Fung | 395/250 |
| 4,688,188 | 8/1987 | Washington | 395/250 |
| 4,926,313 | 5/1990 | Byers et al. | 364/200 |
| 4,972,314 | 11/1990 | Getzinger et al. | 395/425 |
| 4,980,854 | 12/1990 | Donaldson et al. | 395/325 |
| 4,991,084 | 2/1991 | Rodiger et al. | 395/725 |
| 5,203,007 | 4/1993 | Gallagher | 395/800 |

FOREIGN PATENT DOCUMENTS 0446077  9/1991  European Pat. Off. ..... G06F 15/16

OTHER PUBLICATIONS

Karol et al., "Input Vs. Output Queueing on a Space-Division Packet Switch", IEEE 1986, pp. 659–664.

*Primary Examiner*—Allen R. MacDonald
*Assistant Examiner*—Glenn A. Auve
*Attorney, Agent, or Firm*—Floyd A. Gonzalez; James E. Murray; Robert L. Troike

[57] ABSTRACT

An improved arbitration system is disclosed for arbitrating signals at a plurality of input nodes to output nodes where each input node can access any output node. The system includes a FIFO (first-in-first-out) input queue for each node and means for arbitrating the top of each queue for providing the arbitrated output to a given node and means when the top of the input queue has no request for a given node arbitrating the requests from the next to the top entry of the input queues and providing the data from the next to top entry associated with the arbitrated request to the given node.

9 Claims, 5 Drawing Sheets

LOOK-AHEAD PRIORITY ARBITRATION SYSTEM AND METHOD

BACKGROUND OF THE INVENTION

1. Field of the Invention

This invention relates to arbitration systems and more particularly to a look-ahead priority arbitration system and method.

2. Background of the Invention

In the prior art, there is known arbitrating systems such as in U.S. Pat. No. 4,473,880 of Budde et al, or U.S. Pat. No. 4,499,538 of Finger et al, that provide some form of arbitration system to several processors or microprocessors with a common bus. These arbitration systems with a common bus are relatively slow systems in that only an input to the bus from one unit can be applied via the bus to an output unit in a given switch cycle. Cross point switches such as switching matrix as described in U.S. Pat. No. 4,417,245 of Melas et al couple multiple inputs to multiple outputs simultaneously provided a given input does not want to conflict with another given input at the same output and assumes that some form of separate control is provided. U.S. Pat. No. 4,991,084 of Rodiger et al. discloses an arbitration round robin order switching matrix system. U.S. Pat. No. 4,313,161 of Hardin et al. discloses a shared storage for multiple processor systems utilizing a ring counter with a look-ahead feature that performs polling other processors for access to the shared storage. A look ahead bus arbitration system with an override of conditional access grants via bus cycle extensions for multi-cycle data transferred is shown in U.S. Pat. No. 4,980,854 of Donaldson et al. Other prior art disclosures of data processing systems with shared memory or bus arbitration are illustrated in the following patents: U.S. Pat. No. 4,481,572 of Ochsner, U.S. Pat. No. 4,363,094 of Kaul et al, U.S. Pat. No. 4,972,314 of Getzinger et al, U.S. Pat. No. 4,086,629 of Desyllas et al, (hierarchical data store with look-ahead action), U.S. Pat. No. 4,159,532 of Getson, Jr. et al, and U.S. Pat. No. 4,688,188 of Washington.

A computer system can include a number of resources that include processors, memories or I/O devices. It is often necessary for the command to enter data to be transferred between the different resources in a computer system. More particularly a system bus is provided for transferring data between a number of resources or nodes in a multiple node network.

The access to the bus by each of the resources must be controlled. In order to control the coupling to a number of nodes, some form of "arbitration" is performed in order to determine which node obtains access to the bus. An arbitrator determines which resource will be accessed to the bus each cycle.

Large, high band width, input queued cross bar or cross point switches are often used for processor-memory interconnection networks for shared memory multiprocessor systems. In vector processing supercomputer system caches are often not effective and the majority of storage access for vector operations are directly to storage. In these cases latency of the memory sub-system, (time from the storage request to the receipted data) can significantly effect performance. It is desirable to find an arbitrator means that reduces the average request latency thereby providing system performance for supercomputing systems with this type of processor to memory interconnection for example.

SUMMARY OF THE INVENTION

In accordance with one embodiment of the present invention, each arbitrator considers requests not only from the top of each input queue, but also from the next to the top request. If an arbitrator has no request from the top of any input queue, it selects a request (if present) from the "second row" of an input queue. Two requests intended for the same destination in the same input queue will never be arbitrated out of order because the top of the queue request has higher priority.

DETAILED DESCRIPTION OF THE PREFERRED EMBODIMENT

Figure 1:
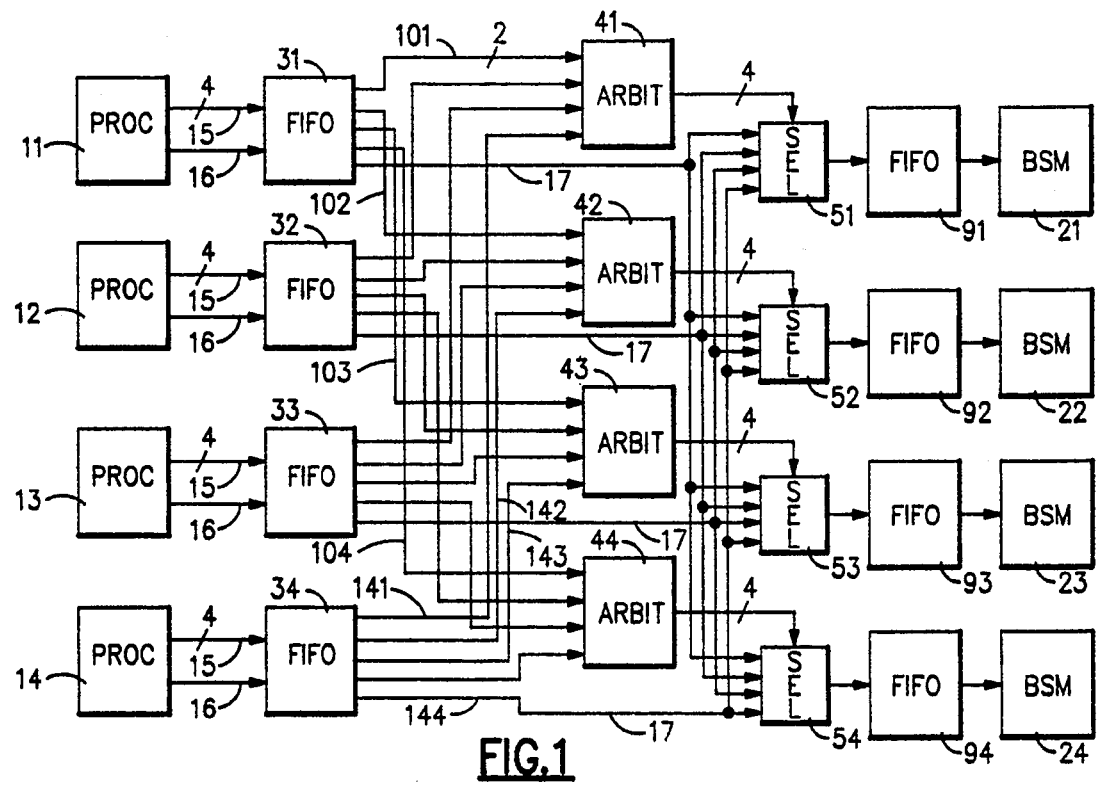
FIG. 1 is a block diagram of an overall computer system according to prior art.

Referring to the system block diagram of FIG. 1 there is illustrated for example an n×m arbitrating non-blocking high band width switch system. The system is like that described in U.S. Pat. No. 4,991,084 of Rodiger et al. This patent is incorporated herein by reference. The system of FIG. 1 includes the processors 11 through 14 being selectively coupled to one of the basic storage modules 21 through 24. The number of these processors connected to basic storage may be 32 or greater. The inputs from the processors 11 through 14 are applied to the respective buffer queues 31 through 34. The buffer queues 31 through 34 may be, for example, queues of FIFO (first-in, first-out) connected registers. The output from each of the processors includes a request code signal and associated data signals or data packet. The request code signal could be simply a logic 1 level at one of four lead wires. The output request code signal from each of the buffer queues 31 through 34 is applied to each of the four arbitrators 41 through 44. The request code signal and associated data signals or data packet are sequenced together through the buffer queues 31 through 34. The request code signal could be via 4 wires or lines (illustrated by lead 15), with only one of the 4 wires being a logic 1 level and the other 3 wires being logic 0 level. The lead 16 carries the data. The request and the corresponding data are stored in the same register of the queue. The logic 1 level, for example, may be 5 volts and the logic 0 will be at zero or ground potential. If, for example, a processor 11 wants to be coupled to the BSM 21, the processor provides a logic 1 level on lead 101 from the buffer queue 31 and logic 0 to leads 102 through 104 at the first request for arbitrators 42 through 44. If the processor 11 wants to be coupled to BSM 22, BSM 23 or BSM 24, the logic 1 level would only be on line 102, 103 or 104 respectively. Likewise, if processor 14 requests to be coupled to BSM 21, 22, 23 or 24, the logic 1 level would only be on line 141, 142, 143 or 144 respectively. Likewise, processors 12 and 13 can be coupled to any one of the basic BSM modules 21 through 24 by appropriate logic 1 level at the request line to the arbitrators 41 through respectively.

Each arbitrator first determines if there is an input from any of the four FIFO buffer queues 31 through 34. If there is more than one input to that arbitrator, it sequences the data inputs each clock cycle through an associated selector 51 through 54. The data is sent via leads 17 to all four selectors 51 through 54. If there are no contentions or more than one processor trying to use a given storage module at the arbitrator, the input from each buffer 31 through 34 at each selector 51 through 54 is simultaneously coupled to the associated BSM 21 through 24 via associated buffer 91 through 94. Selectors 51 through 54 are associated with each of the BSM 21 through 24. The arbitrator 41 through 44 identify which output BSM 21 through 24 the input data from a given processor is to be applied and provide a select code to the selectors 51 through 54 to gate the data from buffer queues 31 through 34 to the appropriate one of buffer queues 91 through 94. The buffer queues 91 through 94 are, for example, FIFO connected registers.

If there is more than one contender for a given BSM, one of the arbitrators 41 through 44 associated with a given BSM determines the sequence out of the associated selectors 51 through 54. For example, if there is a request code signal from processor 11 and from processor 12 via buffers 31 and 32 for BSM 21, they are both applied to the arbitrator 41. The arbitrator 41 provides, for example, a first select code to the selector 51 during the first clock pulse to gate the output from the FIFO buffer queue 31 through the selector 51 to buffer queue 91 and to the BSM 21. During the next clock cycle, the second select signal code is provided to selector 51 and processor 12 data at buffer queue 32 is coupled through the selector 51 to the BSM Module 21.

Figure 2:
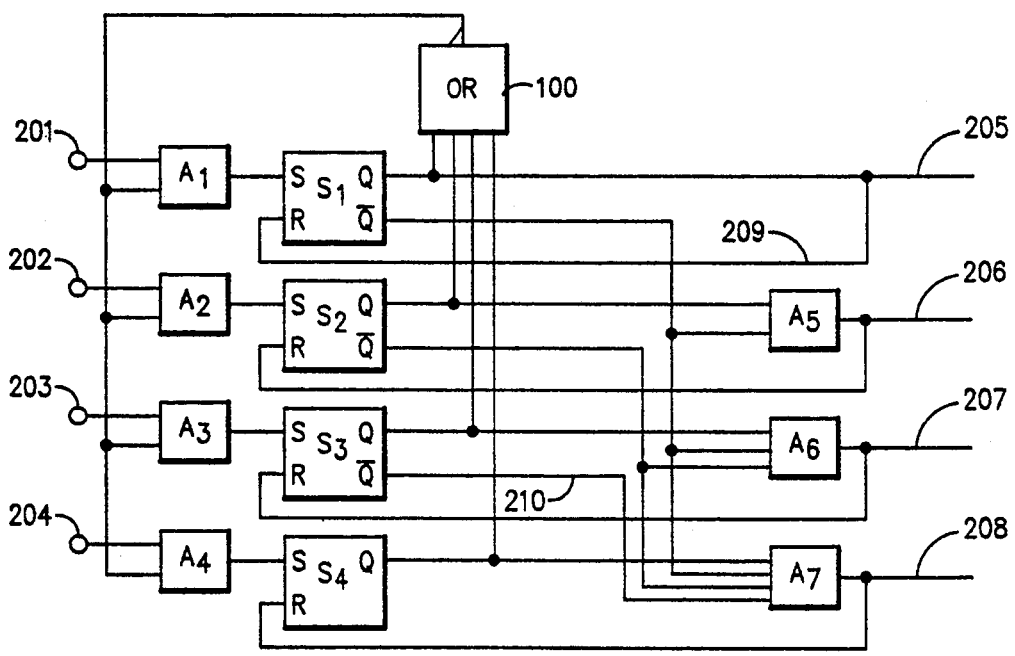
FIG. 2 is a block diagram of the arbitrator in FIG. 1.

In FIG. 2, there is illustrated a logic block diagram for each arbitrator of FIG. 1. There are four input request ports 201 through 294 for each arbitrator 41 through 44. The first input port 201 is coupled to processor 11 via buffer queue 31. For arbitrator 41, this input port 201 is coupled via wire lead 101. The second input port 202 is coupled to processor 12 via buffer queue 32, the third port 203 is coupled to processor 13 via buffer queue 33, and the fourth port 204 is coupled to processor 14 via buffer queue 34. The request at inputs 201 through 204 are applied to the respective AND gates A1 through A4. The outputs from AND gates A1 through A4 are applied to the set inputs of flip-flop registers S1 through S4. The Q output from register S1 is applied directly to the output lead 205 and to NOR gate 100. The Q outputs from the registers S2 through S4 are also applied to the NOR gate 100. The Q output of switching register S1 is applied to AND Gate A5. The Q output of switches S3 and S4 are coupled to the respective inputs of AND Gates A6 and A7. AND Gate 6 also receives the Q output from registers S1 and S2. AND Gate A7 receives a Q output from registers S1, S2 and S3 and the Q output from register S4. The Q output from switch S1 is applied to the reset input of switch S1. The output of AND Gate A5 is coupled to the reset input of register S2. The output of AND Gate A6 coupled to the reset input of register S3 and the output of AND Gate A7 is coupled to the reset input of register S4. The outputs of AND Gates A5 through A7 on leads 206 through 208 and the Q output of register S1 on lead 205 provide a four-bit address code which is applied to the corresponding selector 51 through 54 to select the input. In actual practice for the simple embodiment of FIG. 1 with only four processors and four BSM modules that one of the arbitrator outputs 205 through 208 having a logic 1 level would enable the associated processor data to the associated basic storage module. For example, if the output from register S1 is at the logic 1 level, the processor 11 output will be coupled to the basic storage module associated with the arbitrator. If S1 is at logic 1 at arbitrator 41, processor 11 data would be coupled to BSM 21. If S1 is at logic 1 at arbitrator 42 processor 11 data is coupled to BSM 22, if S1 is at logic 1 at arbitrator 43 processor 11 data is coupled to BSM 23, and if S1 is at logic 1 at arbitrator 44 processor 11 is coupled to BSM 24. If at arbitrator 41 there is a logic 1 level at output 208 of arbitrator 41, the data from processor 14 would be coupled to the basic storage module 21. If the logic 1 level is at output 208 of arbitrator 42, the data from processor 14 is coupled to BSM 22. If at arbitrator 43 from processor 14 to BSM 23, etc.

In the start-up state of the arbitrator, there are all logic zeros at the Q outputs and logic 1 levels at the $\overline{Q}$ outputs of registers S1 through S4. The NOR Gate 100 provides a logic 1 level to AND Gates A1 through A4 with all zeros at its input. If there is only a request or logic 1 level at input 202, for example, this output enables AND Gate A2 with a logic 1 coupled to the set input of switch S2 to thereby provide a logic 1 level at the Q output of register S2. The logic 1 level output from register S2 is coupled to the NOR Gate 100 and in response to this logic 1 a logic low or zero level from NOR Gate 100 is provided to AND Gates A1 through A2, stopping all further requests. The logic 1 level input of AND Gate A5 from register S2 enables the logic 1 level input from the $\overline{Q}$ output of register S1 to provide logic 1 level at the output 206. This code with a logic 1 level only on lead 206 requests the selector 51 through 54 associated with the arbitrator to couple the data from the second processor 12 to the basic storage module associated with the selector. For example, with arbitrator 41 the data from processor 12 is coupled to BSM 21.

A contention exists when there are two or more requests for a given BSM. For example, in the analysis, consider requests at inputs 201 and 203 from processors 11 and 13 for BSM 21. The arbitrator 41 sees the presence of a logic 1 level at AND Gates A1 and A3 to enable the logic 1 from NOR Gate 100 to produce a set of logic 1 levels at the set inputs of registers S1 and S3. This produces a logic 1 level at the Q outputs of registers S1 and S3. The presence of the logic 1 level at either of these "Q" outputs of the NOR Gate 100 provides a logic "0" at the AND Gates A1 through A4 which stops any further requests. A logic zero or low level is provided from the $\overline{Q}$ outputs of registers S1 and S3 to the AND Gates A5 through A7. AND Gate A6 output remains at a logic zero with the $\overline{Q}$ output from register S1 being low. In effect, only the request at input 201 for BSM 21 is acknowledged at the first clock cycle.

As soon as the selection is made to couple the data from processor 11, the register S1 is reset via lead 209 providing a logic one at the $\overline{Q}$ output of register S1 to AND Gate A6 and allowing the request at input 203 to provide a logic 1 from AND Gate A6. This logic 1 at output 207 of AND Gate A6 selects the data then from processor 13 to the associated BSM on the next clock cycle. After the requestor at input 203 selects the data, register S3 is reset by the feedback path 210 from AND Gate A6 and the NOR output from NOR Gate 100 goes high. When the NOR Gate output goes high, all of the registers S1 through S4 are off and any combination of input requests can be acknowledged in the next full cycle.

In the example given in FIGS. 1 and 2, there were two clock cycles required to handle two simultaneous requests for the given basic storage module. Since port requests are generated every cycle, the storage for the input buffers should equal the number of processors. For example, in FIG. 1 this would require four buffer stages to cover the case where all four processors would be attempting to communicate with a given basic storage module. They would be stored and sequenced over four clock cycles. In the example given, there were only four inputs processor coupling to four basic storage modules, but in a preferred application there would be, for example, 32 processors communicating with 32 or more storage modules. The system would include encoder and decoders as illustrated in FIGS. 3A and 3B in cited U.S. Pat. No. 4,991,084.

The arbitrators as shown in FIG. 2 always acknowledge multiple requests in round robin order of S1 through S4 until all are satisfied; that is, in instant case the request at input 201 has the highest priority with request at input 202 second, input at 203 third and input at 204 having the lowest priority within that arbitration cycle.

It can be seen that during one clock cycle four port requests can be distributed across the four BSMs, a maximum of four BSM selects can be serviced per clock cycle period. The minimum would be one BSM select per cycle where all port requests are for the same BSM.

Figure 3:
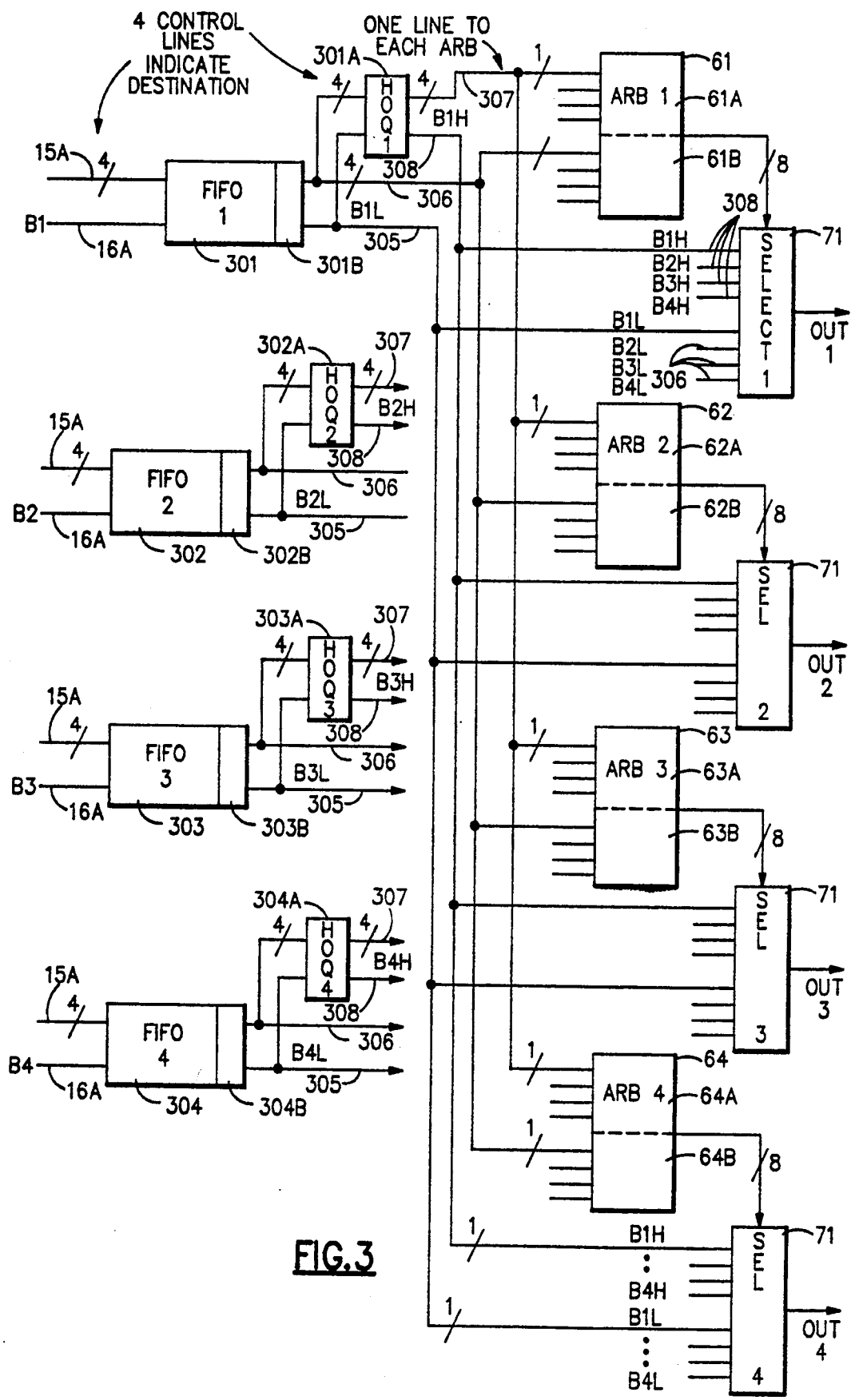
FIG. 3 is a block diagram of the look ahead priority arbitration system according to the present invention.

Referring to FIG. 3, there is illustrated a look-ahead priority arbitration system in accordance with the present invention. In accordance with the present invention, FIFO queues 301, 302, 303 and 304 receive requests and data on corresponding input request buses B1 through B4. Each bus has four request lines 15a and data lines 16a (one request line for each BSM as in FIG. 1). The requests may come from the four processors 11-14 in FIG. 1. Each FIFO queue 301-304 corresponds to FIFO queues 31-34 in FIG. 1. In accordance with the present invention each queue comprises FIFO connected registers. Each queue 301-304 includes two sets of outputs, one at the front element of the queue in an HOQ (Head Of Queue) register 301A-304A and one from a next to head (secondary) of the queue at second to head register 301B-304B. If an element (request and data) arrives at an empty FIFO queue it is placed in the corresponding HOQ register 301A-304A. If the entry at the HOQ register remains there as a result of request conflicts at the head of the FIFO queue, consecutive elements arriving at the FIFO queue are placed in the FIFO order of the queue. The second entry or register (next to head) 301B-304B in the queue 301-304 is provided by a second set of outputs on leads 305 and 306 in accordance with the present invention. This second entry in the FIFO queue may always be arbitrated in a cycle although at a lower priority than the HOQ register 301A-304A. There is therefore at the output of each FIFO queue 301-304 an output at leads 307 and 308 from the HOQ register (301A-304A) and output at leads 305 and 306 from the second order of the queue register 301B-304B. In accordance with the present invention the arbitrators 61 through 64 would each have two identical arbitrator sections A and B with section A of 61-64 coupled to the HOQ registers 301A-304A via leads 307 and the second arbitrator section B coupled via leads 305 to the outputs from the lower priority registers 301B-304B or second entries in the FIFO queue.

Figure 4:
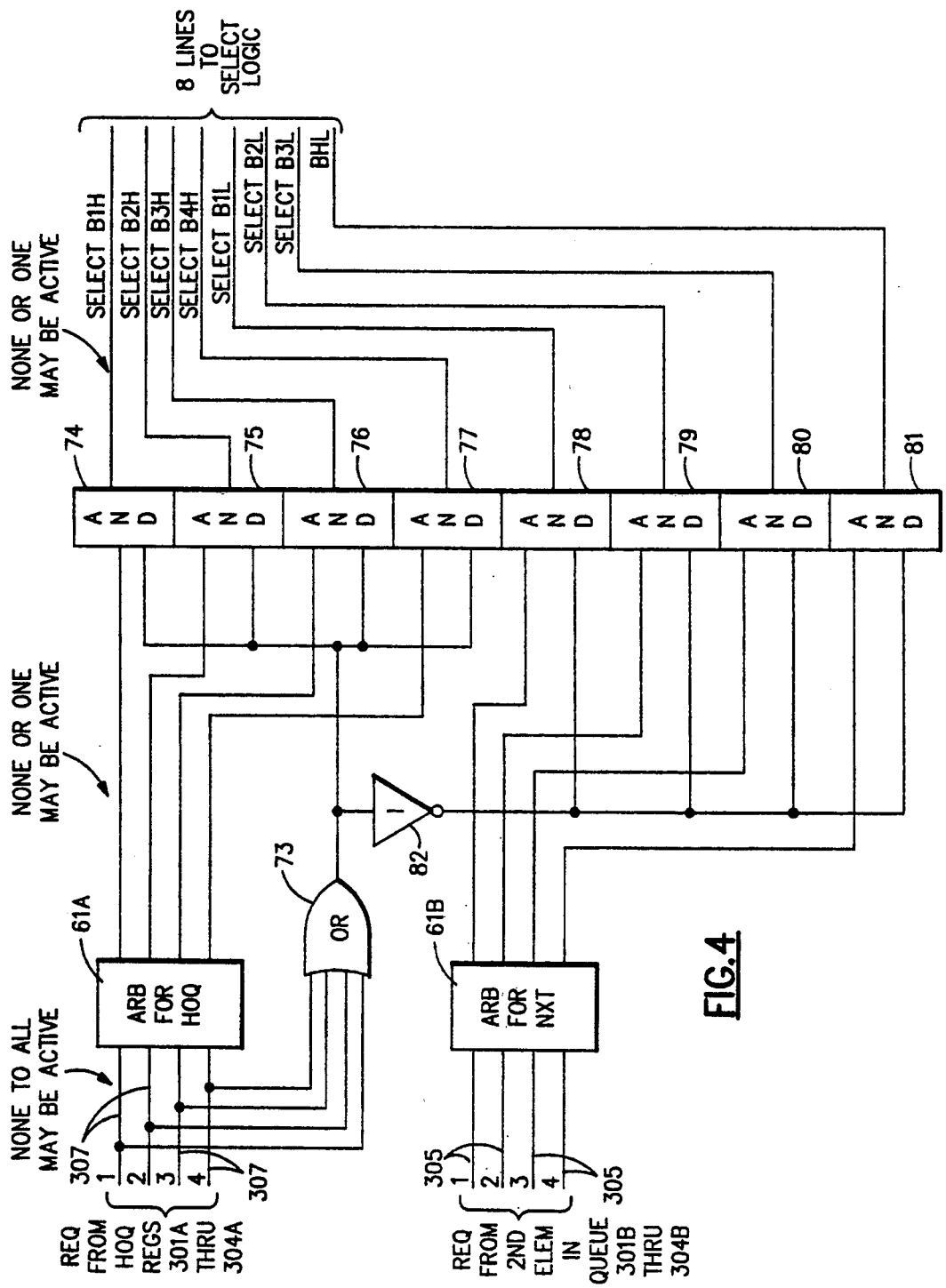
FIG. 4 is an expansion of any of the arbitrators of FIG. 3.

Each of the arbitrators 61 through 64 for example would include a duplicate of FIG. 4 which illustrates arbitrator 61 with a high priority arbitrator 61A and a low priority arbitrator 61B. Each of these arbitrators 61A or 61B, for example, may operate separately on a round robin basis with the HOQ requests and second level requests as described previously in connection with FIG. 2. In accordance with the present invention the output of arbitrator 61A is enabled via OR gate 73 and AND gates 74-77 where there is a request present from one of the HOQ registers 301A-304A of FIFO queues 301-304 at the HOQ arbitrator 61A. If there is no request present at the input to arbitrator 61A from the HOQ registers 301A-304A, the AND gates 74-77 are not enabled via OR gate 73 but the AND gates 78-81 are enabled via inverter 82 and OR gate 73. This selects a request, if present, from the second row 301B-304B of the FIFO input queue 301-304 via arbitrator 61B. This allows an improvement in the switch throughput since otherwise idle arbitrators will now be used to switch requests present in the next to top queue positions.

Each select logic 71 in FIG. 3 receives output from the eight AND gates 74-81 to select at most one request. The eight possible inputs—4 from the HOQ register queue 301A-304A (B1H-B4H) and 4 from the next or second row of registers 301B-304B (B1L-B4L) with higher and given priority to the input from the HOQ registers 301A-304A. That one control line of the eight (select B1H—select B4L) in FIG. 4 with the logic one passed by the AND gates 74-81 selects its corresponding data on bus B1H-B4L (leads 306 and 308) to the output. The output may be, as shown in FIG. 1, to FIFO's 91-94 to memory modules 21-24.

For top of queue only arbitration using any algorithm (round robin, queue depth, random select, etc.) it has been theoretically shown that input queue "saturation" takes place at input utilizations ranging from 75 percent (for a 2×2 switch) to 58 percent (for infinity×infinity switch). "Saturation" is defined as that input request utilization where in the steady state the input queue depth continues to increase with time. This is discussed in a paper (CH2298-9/86/0000-0659) of Karol, Hluchyi and Morgan entitled "Input vs. Output Queueing on a space Division Packet Switch". For a 4×4 switch, saturation occurs at 65 percent.

Figure 5:
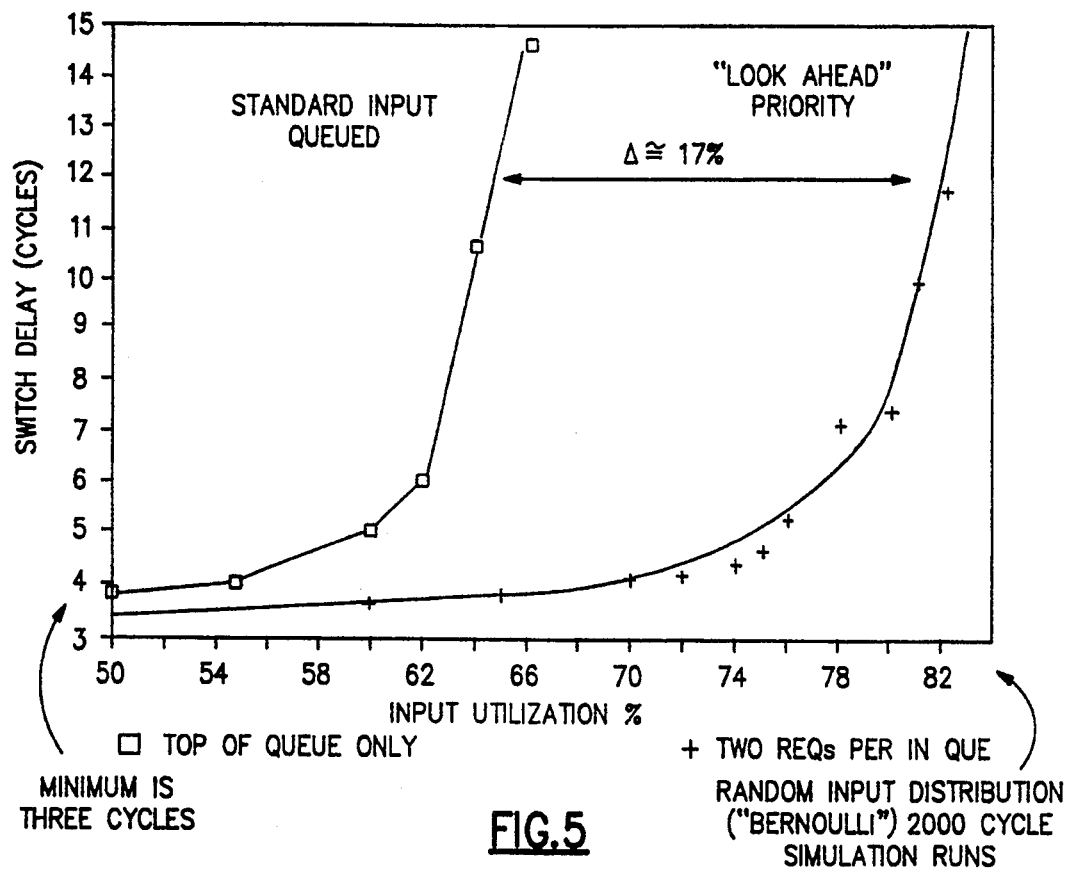
FIGS. 5 through 7 are a plot of switch delay cycles versus input utilization percentage for 4×4, 4×5 and 8×8 crosspoint switches illustrating the advantages of the look-ahead priority system and method.

FIG. 5 illustrates significant improvement in throughput using look-ahead priority according to a simulation model. This model for a 4×4 switch shows an improvement in saturation utilization from 65 percent to about 82 percent. Similar results would also occur for different size switches. The simulation model was constructed for an N by M cross bar switch.

Figure 6:
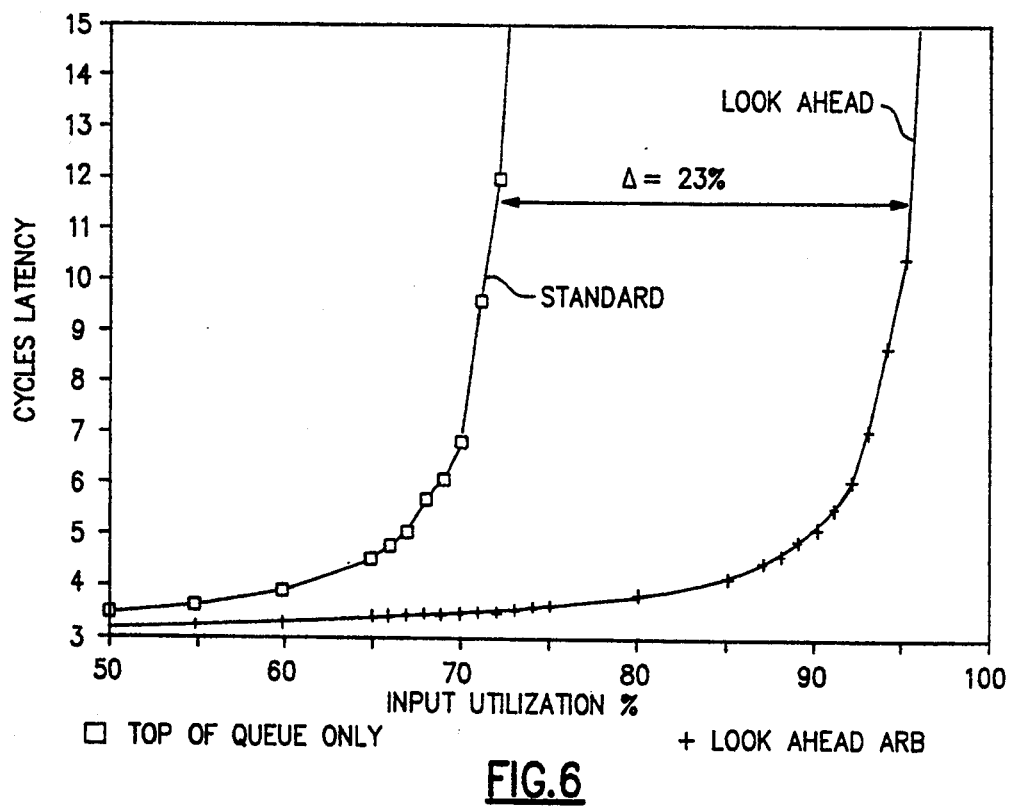
Figure 7:
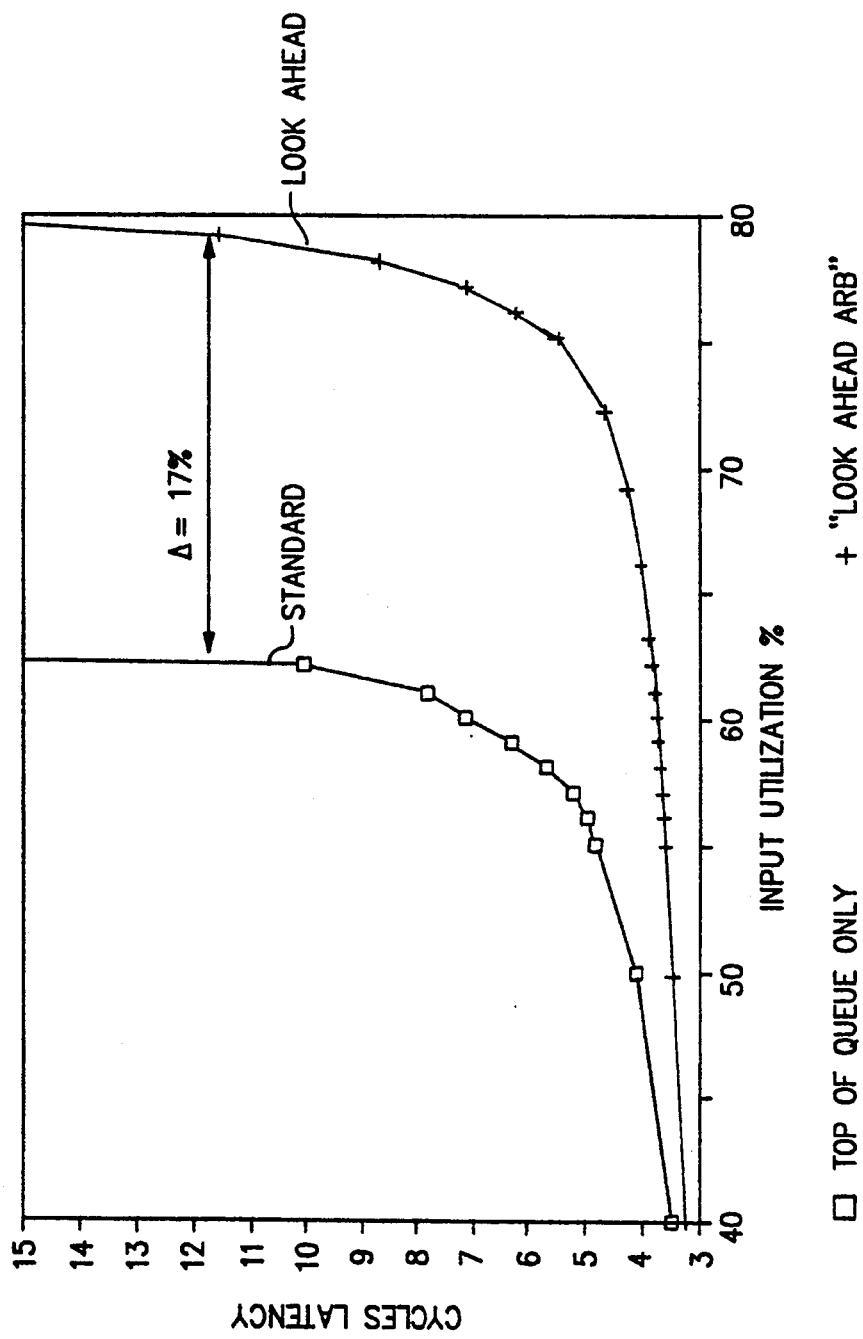

FIG. 6 shows the improvement for a 4×5 crosspoint switch and FIG. 7 for an 8×8 crosspoint switch. Obviously, third and fourth entry levels from the head of the queue will further increase the throughput following the teachings herein.

It is also important to know that additional priorities (such as scalar over vector) may be added to these priorities for arbitration. Also as discussed in U.S. Pat. No. 4,991,084, the invention can be used for many more processors such as the 32 processors shown in FIG. 3A and FIG. 3B of this referenced patent. In this case there would be encoders and decoders as shown in FIGS. 3A and 3B and discussed in the patent.

While there have been described above various embodiments of-the present invention for the purpose of illustrating the manner in which the aforementioned may be used to advantage, it will be appreciated that the invention is not limited to the disclosed embodiments. Accordingly, any modification, variation or other arrangement within the scope of the accompanying claims should be considered within the scope of the subject invention. In particular, note that the invention could be used for an asymmetrical switch where the number of input sources (N) is not necessarily equal to the number of output buses (M). An example is a 4×5 switch for which there is the 32 percent improvement shown in FIG. 6.

We claim:

1. An arbitration system for selecting a single request for transmission to one output node from multiple such requests for transfer made by contending input nodes, said arbitration system comprising:

a plurality of input queues one associated with each of said contending input nodes, each such input queue for storing, in a plurality of stages, requests from its associated input node, at least two of said stages in each queue being separately accessible output stages, one stage being a head of queue stage and another stage being a next to head of queue stage;

arbitration means connected to both output stages of each queue for selecting, during a single selection cycle, a request from either a head of queue stage or a next to head of queue stage of one of said queues in accordance with a selection algorithm, said arbitration means including primary selection means for selecting a request from a head of queue stage if such a request is present in any said head of queue stage and secondary selection means for selecting a request from a next to head of queue stage in a queue selected by said algorithm in the absence, during said selection cycle, of any such request in any head of queue stage of said queues.

2. The arbitration system of claim 1 wherein:

said arbitration means includes:

first and second arbitrating circuits operating in parallel, one arbitrating circuit coupled to the head of the queue stages of said queues for selecting between contending requests in the head of the queue stages and another arbitrating circuit coupled to the next to head of queue stages for selecting between contending requests in the next to head of queue stages; and sense means for providing a first signal at an output in response to the presence of a request in any head of queue stage of said queues and a second signal at an output in the absence of such a presence.

3. The arbitration system of claim 2 wherein:

said primary selection means includes a first set of AND gates transmitting the selection of said one arbitrating circuit to said one output node in response to said first signal; and said secondary selection means includes a second set of AND gates providing the selection of said another arbitrating circuit to said one output node on occurrence of said second signal.

4. The arbitration system of claim 3 wherein:

said first and second arbitrating circuits each have a plurality of outputs, one output associated with each of said queues;

said set of AND gates of both the primary and secondary selection means each containing one AND gate for each of said queues with one input of each such AND gate coupled to the output associated with said queue of the appropriate one of said first and second arbitrating circuits and another input of each such AND gate connected to an output of said sense means.

5. The arbitration system of claim 4 wherein said queues are FIFO queues.

6. The arbitration system of claim 5 wherein said selection algorithm is a round robin selection algorithm.

7. A method for transferring, one at a time, to a single output node, sets of signals, made up of a request signal and data signals, said sets of signals being supplied by a plurality of requesting nodes contending for such transfer said method comprising the steps of:

a) placing said sets from each requesting node in stages of separate queues in the order in which said sets are to be transferred to the output node;

b) simultaneously selecting for transfer from said queues a first output from stages containing highest order requests for transfer to said one output node and a second output from stages containing next highest order requests for transfer to said one output node;

c) detecting the presence or absence of a request for transfer in any of said stages of said queues for containing the highest order requests;

d) transferring to said one output node data signals in said first output if the presence of a request for transfer to said one output node is detected by step c) and transferring to the output node data signals in said second output if the presence of a request is not detected by step c).

8. The method of claim 7 including selecting the first and second outputs in step b) is in accordance with a round robin algorithm.

9. The method of claim 8 including ordering said requests in said queues so that the first request in is the first request out (FIFO).

* * * * *